United States Patent [19]

Blackstone

[11] Patent Number: 4,683,471

[45] Date of Patent: Jul. 28, 1987

[54] DATA BUS PILOT TONE

[75] Inventor: Gary W. Blackstone, Mission Viejo, Calif.

[73] Assignee: Hughes Aircraft Company, Los Angeles, Calif.

[21] Appl. No.: 696,662

[22] Filed: Jan. 30, 1985

[51] Int. Cl.$^4$ ............... H04Q 3/00; H04J 1/02; H04N 3/02
[52] U.S. Cl. ............... 340/825.5; 340/825.05; 370/85; 370/74
[58] Field of Search ........... 340/825.5, 825.51, 825.05; 370/85, 50, 74, 98

[56] References Cited

U.S. PATENT DOCUMENTS

| | | | |
|---|---|---|---|
| 4,063,220 | 12/1977 | Metcalfe et al. | 340/825.5 |
| 4,101,738 | 7/1978 | Bellanger et al. | 370/74 |
| 4,238,849 | 12/1980 | Gassmann | 370/74 |
| 4,259,663 | 3/1981 | Gable | 340/825.5 |
| 4,390,990 | 6/1983 | Ainsworth | 340/825.5 |
| 4,432,088 | 2/1984 | Frankel | 340/825.5 |
| 4,466,000 | 8/1984 | Jansen et al. | 340/825.5 |
| 4,519,074 | 5/1985 | Basile | 370/85 |
| 4,596,011 | 6/1986 | Kobayashi et al. | 340/825.5 |
| 4,617,656 | 10/1986 | Kobayashi et al. | 370/74 |

FOREIGN PATENT DOCUMENTS

| | | |
|---|---|---|
| 0113230 | 7/1984 | European Pat. Off. |
| 59-132258 | 11/1984 | Japan |
| 2095078 | 9/1982 | United Kingdom |

Primary Examiner—Ulysses Weldon
Assistant Examiner—Ralph E. Smith
Attorney, Agent, or Firm—Joseph E. Szabo; Anthony W. Karambelas

[57] ABSTRACT

A local area network transceiver (10) which includes a transmitter section (20) for providing a data signal and a pilot tone signal which are combined as a transmit signal for transmission on a local area network data bus (11). The transceiver further includes a receiver section (30) which receives signals on the data bus (11) and includes circuitry for filtering the received signal into a received data signal and a received pilot tone signal (23,25,27). Comparison circuitry (29,31,33) is responsive to the transmit pilot tone signal and the received pilot tone signal, and produces an output indicative of whether the received pilot originated from the transmit pilot tone. Logic circuitry (35,37,39,41,43) is responsive to the comparison output to provide outputs indicative of whether transmission collision has occurred or whether activity is present on the data bus.

6 Claims, 4 Drawing Figures

DATA BUS PILOT TONE

BACKGROUND OF THE INVENTION

1. Field of the Invention

The disclosed and claimed invention generally relates to local area networks, and is particularly directed to a transceiver which includes circuitry for detecting the presence of two or more data signals on the communications channel of a local area network.

2. Background Art

The ever increasing use of electronic information processing devices and their high speed processing capabilities has created a need for high speed data communications within a local area of limited geographic scope, such as a building or a small campus. Efforts to meet the need have produced a variety of networking schemes referred to as local area networks or LANs. The known LANs differ in their characteristics, including transport technique, transmission medium, topology, and access protocol.

The disclosed invention is for use with a local area network which utilizes baseband techniques for data communication over a common data bus such as coaxial cable. In such a bus configuration, the coaxial cable is of limited length (e.g., 600 meters without a repeater) and is appropriately terminated at both ends. Individual station equipment such as computers, video display terminals and storage device access the cable via a Bus Interface Unit (BIU) and a Bus Access Module (BAM). The station equipment is connected to the BIU which implements the particular protocol of the local area network. The BIU may be embedded within the station equipment and is coupled to the cable through a BAM which includes among other elements a transceiver. The BAM is typically coupled to the cable with a high impedance transmission tap. A station and its associated BIU and BAM collectively are sometimes referred to as a terminal.

In order to insure proper receipt of messages, only one message can be on a local area network bus at any given time. Therefore, protocols have been developed to insure that a given message can be transmitted and received.

One widely used protocol is referred to as Carrier Sense Multiple Access/Collision Detect (CSMA/CD) wherein a terminal wanting access to the data bus first determines whether the data bus is being used. If the data bus is being used, the terminal waits until the transmission is completed. Otherwise, the terminal begins to transmit. With the CSMA/CD protocol, the transmitting terminal must detect collisions caused by at least two terminals transmitting simultaneously. Generally, a transmitting terminal detects collisions by monitoring the data bus to determine whether the message on the bus agrees with the message it transmitted. If it does not agree, then some form of collision recovery procedure is implemented.

Another protocol technique is known as token passing wherein the token, essentially a codeword, is sent sequentially from one terminal to another. Only the terminal possessing the token is permitted to transmit. After the token possessing terminal finishes transmitting or if it has nothing to transmit, it transmits the token for reception by the next terminal in a predetermined sequence. To the extent that the next terminal does not accept the token within a predetermined time interval, such terminal is assumed to be inactive or non-existent. The appropriate protocol procedure is then implemented for transmitting the token to next terminal after the non-responsive terminal.

With either type of protocol, each terminal must detect (i) the occurrence of collision, and (ii) activity on the data bus. While token passing is designed to avoid collision, collision detection must still be utilized with a token passing protocol since collision may still result from the addition of new teminals, malfunctions, and/or transmission errors.

With networks utilizing long cables and/or wideband data signals, detection of collision by a transmitting terminal is difficult where the contending transmission is a signal from a remote distant terminal, since the contending signal from the remote distant terminal is considerably attenuated while the data signal of the local transmitting terminal has a high level. Such attenuation of the data signal from a remote distant terminal results from the attenuation properties of the data bus.

Known techniques for collision detection include detecting the presence or absence of the ac components of two or more simultaneous baseband data signals. However, detection of a very low level contending signal from a distant remote terminal is unreliable.

Another known technique for collision detection involves detection of the dc component of two or more simultaneous baseband data signals. This technique requires dc coupling between each terminal and the data bus if message length is not limited. However, dc coupling can result in circumstances where the failure of one coupler may affect the couplers of other terminals.

A known technique for activity detection involves detection of the presence or absence of baseband data signals. However, with such technique reflections may be erroneously detected as busy activity. Erroneous detection of bus activity would prevent utilization of the cable and perhaps unnecessary implementation of collision recovery procedures since bus protocols typically depend upon accurate activity detection for proper operation.

Thus, in general, present data bus type local area networks required complex circuitry to detect collisions and activity, and such circuitry becomes unreliable under known circumstances.

Without the use of repeaters, the complexity of collision/activity detection presently limits the number of terminals which a local area network can accommodate and the length of cable for such a network. While the use of repeaters allows a local area network to accommodate more terminals and a larger data bus, the use of repeaters significantly reduces the reliability of the data bus.

SUMMARY OF THE INVENTION

It is therefore an object of the invention to provide for local area networks a transceiver which allows local area networks to accommodate more terminals and longer communications channels without the use of repeaters.

Another object of the invention is to provide for local area networks a transceiver having collision and activity detection circuitry which does not rely on data carrying signals.

Still another object of the invention is to provide for local area networks a transceiver having collision and activity detection circuitry that is relatively insensitive to the data bus impairments which affect data carrying signals.

A further object of the invention is to provide for local area networks a transceiver having collision and activity detection circuitry which provides a pilot tone with each transmission.

Still a further object of the invention is to provide for local area networks a transceiver having collision and activity detection circuitry which utilizes a pilot tone having a frequency that is near an edge of the bandwidth occupied by data carrying signals.

It is also an object of the invention to provide for local area networks a transceiver having collision and activity detection circuitry which utilizes a pilot tone having a frequency that is not substantially attenuated by the data bus.

Another object of the invention is to provide for local area networks a transceiver having collision and activity detection circuitry which utilizes a low-level pilot tone which is readily detected and does not interfere with the data carrying signals.

The foregoing and other objects of the invention are accomplished in a transceiver which includes transmitting circuitry for transmitting a pilot tone at least during the time such station is transmitting data and further includes receiver circuitry for receiving pilot tones transmitted by such terminal or any other terminal. The receiver circuitry includes comparison circuitry for determining whether received pilot tone signals are from another terminal or from the associated transmitted circuitry.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION

Figure 1:
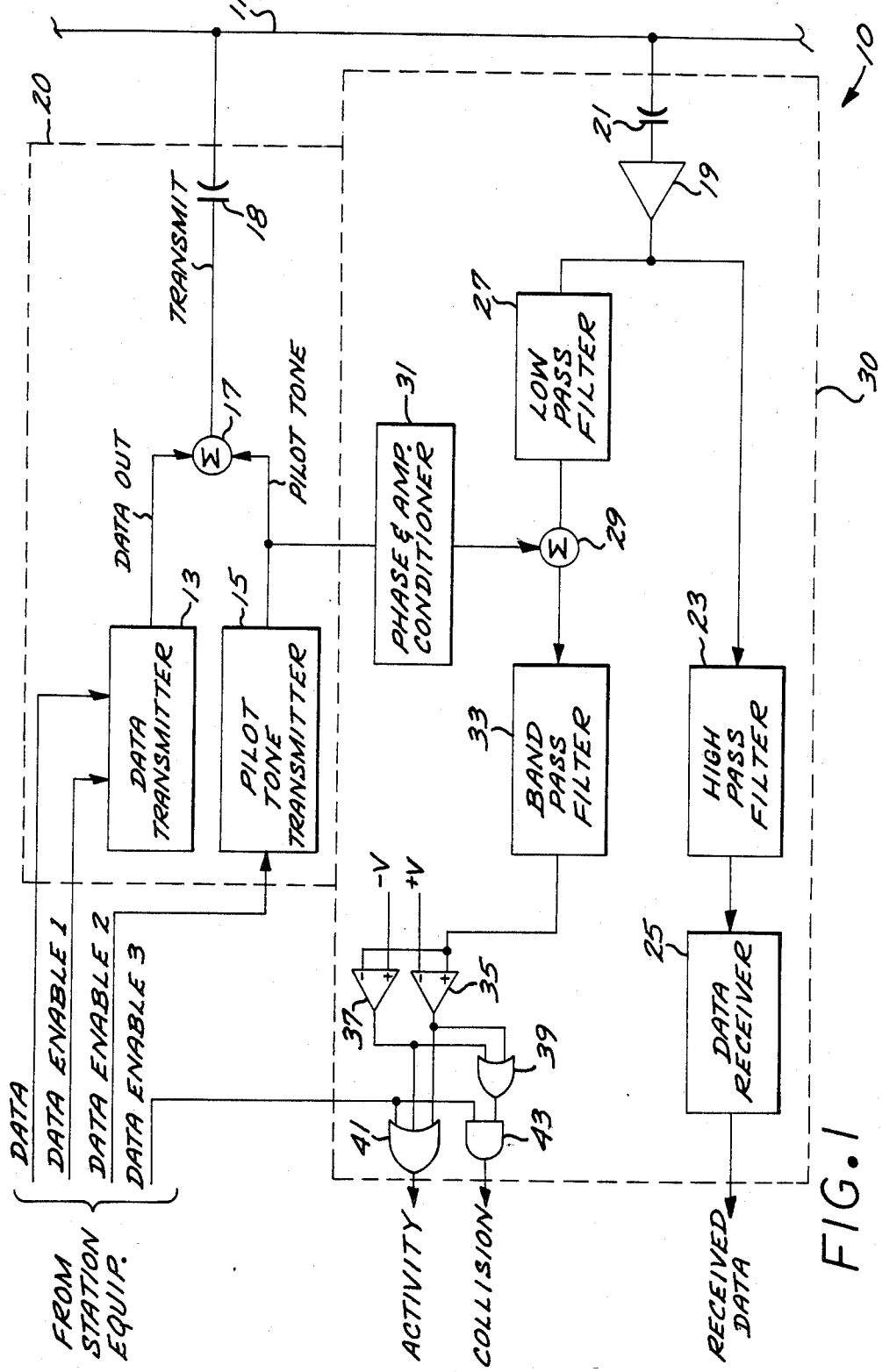
FIG. 1 is a block diagram of the disclosed transceiver.

In the following detailed description and in the several figures of the drawing, like elements are identified with like reference numerals.

Referring now to FIG. 1, the transceiver 10 of the invention generally includes a transmitter section 20 and a receiver section 30. The transmitter section 20 provides a transmitted signal to the communications medium which, for example, may be a coaxial cable or a fiber optic cable, and is referred to as a data bus 11. The receiver section 30 is responsive to the signals on the data bus 11 and provides as outputs received data and respective signals indicative of collision and/or activity.

Figure 2:
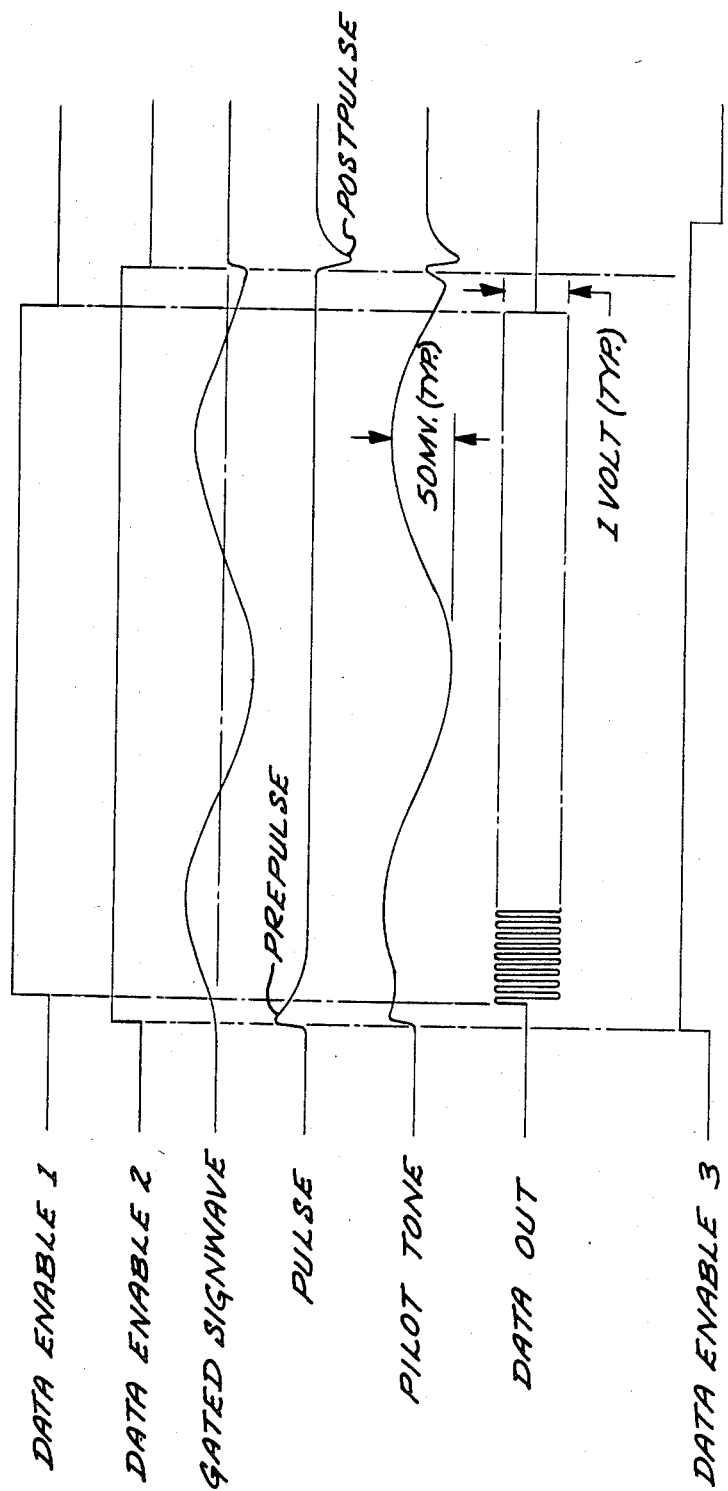
FIG. 2 is a timing diagram of signals utilized in the transmitter section of the transceiver of FIG. 1.

Referring also to FIG. 2, the transmitter section 20 includes a data transmitter 13 which accepts as inputs from the associated station equipment (not shown) an encoded DATA signal and a DATA ENABLE 1 signal. The DATA signal is a logic compatible signal (e.g., TTL or ECL) which is baseband encoded (e.g., Manchester or Miller encoding) to insure that clock information can be recovered from the transmitted signal. The data transmitter 13 converts the DATA signal to provide as an ouptut a bipolar DATA OUT signal. The DATA ENABLE 1 signal is a control signal from the station equiment which enables the data transmitter 13 to output the DATA OUT signal.

The transmitter section 20 further includes a pilot tone transmitter 15 which accepts as an input a DATA ENABLE 2 signal which is provided by the station equipment. The DATA ENABLE 2 signal enables the generation of a gated sine wave and provides for a PULSE signal which is generated by the pilot tone transmitter 15. As specifically shown in FIG. 2, the PULSE signal includes a positive going pulse called a PREPULSE on the positive edge of the DATA ENABLE 2 signal, and further includes a negative going pulse called a POSTPULSE on the negative edge of the DATA ENABLE 2 signal. The PULSE signal and the gated sine wave signal are combined to provide a composite PILOT TONE signal.

The DATA OUT signal and the PILOT TONE signal are summed in a summing circuit 17 which provides a TRANSMIT signal which is communicated via a coupling capacitor 18 to the data bus 11. The TRANSMIT signal is therefore a superposition of the gated sine wave, the PULSE signal and the DATA OUT signal. For reference purposes, the composite signal on the communication cable is referred to as the BUS signal which includes a data conveying BUS DATA signal and a BUS PILOT TONE signal.

The DATA ENABLE 2 signal is timed to go high prior to the DATA ENABLE 1 signal so that the composite PILOT TONE signal which includes the PREPULSE signal starts prior to the DATA OUT signal. The presence of the PREPULSE signal insures that a sufficient pilot tone component is present even for a transmission as short as one data word, which in some systems may be as short as seventeen bits. It should be noted that in systems wherein the minimum message length is longer than one word, the PREPULSE signal may not be required.

The DATA ENABLE 2 signal is further timed to go low after the DATA ENABLE 1 signal so that the composite PILOT TONE signal that includes the POSTPULSE continues after the DATA OUT signal ceases. The presence of the POSTPULSE signal insures that collision can be detected at the end of a message. Since the PILOT TONE signal is turned off after the DATA OUT signal ceases, any high frequency components due to turn off of the PILOT TONE signal do not interfere with the DATA OUT signal. For reference purposes, the transmitter section is considered to be transmitting when the DATA ENABLE 2 signal is high. However, it should be clear that data conveying transmission occurs over the slightly shorter interval when the DATA ENABLE 1 signal is high.

Effectively, the PILOT TONE signal is a reference signal that is present at least during the time the DATA OUT signal is present. The PREPULSE and POSTPULSE components of the PILOT TONE signal assure that collisions can be reliably detected when messages on the data bus 11 barely overlap. As will be discussed below, the resulting BUS PILOT TONE signal can be more reliably detected that the BUS DATA signal.

The frequency of the gated sine wave component of the PILOT TONE signal is nominally chosen to be numerically about two decades less than the bit rate of the DATA OUT signal so that the BUS PILOT TONE signal does not interfere with recovery of the encoded BUS DATA OUT signal. Also, the frequency of the PILOT TONE signal is chosen so that it is minimally attenuated by the data bus 11. The amplitude of the gated sine wave component of the PILOT TONE signal is generally chosen to be sufficiently large to be reliably detectable and yet sufficiently small so that it does not prevent detection of BUS DATA signals of lowest anticipated amplitude.

The following Table I sets forth by way of example typical parameters for the diclosed transmitter section 20 for use with RG 217 coaxial cable:

TABLE I

| | |
|---|---|
| DATA OUT Bit Rate: | 100 Mbps |
| DATA OUT Transmit Amplitude: | 1 V peak-to-peak |
| Min. BUS DATA Amplitude: | 60 mV peak-to-peak |
| PILOT TONE Sine Wave Frequency: | 1 MHz |
| PILOT TONE Transmit Amplitude: | 50 mV peak-to-peak |
| Min. BUS PILOT TONE Amplitude: | 40 mV peak-to-peak |

FIG. 2 further shows a DATA ENABLE 3 signal which is a control signal provided by the associated station equipment and is utilized by the receiver section 30. While the DATA ENABLE 3 signal is not utilized by the transmitter section 20, it is included in FIG. 2 to show that the DATA ENABLE 3 signal goes high with the DATA ENABLE 2 signal but stays high longer than the DATA ENABLE 2 signal.

The receiver section 30 includes a receiver input amplifier 19 which has its input capacitively coupled via a coupling capacitor 21 to the communications cable 11 to receive the composite BUS signal. The receiver input amplifier 19 is typically a high input impedance current amplifier with unity voltage gain. The receiver input amplifier 19 provides as an output a composite RECEIVE signal which is provided to a high pass filter 23. The high pass filter 23 filters out the received BUS PILOT TONE signal and outputs the received BUS DATA signal to a data receiver 25. The data receiver 25 converts the bipolar received BUS DATA signal to a logic compatible signal (e.g., TTL or ECL). The logic signal is output by the data receiver 25 as a RECEIVED DATA digital signal for use by the associated station equipment.

The composite RECEIVE signal at the output of the receiver input amplifier 19 is further provided to a low pass filter 27 which filters out the received BUS DATA signal and outputs the received BUS PILOT TONE signal to a subtraction circuit 29. A phase and amplitude conditioner 31 is responsive to the PILOT TONE signal of the transmitter section 20 and processes the PILOT TONE signal to provide a CONDITIONED PILOT TONE signal as another input to the subtraction circuit 29. The CONDITIONED PILOT TONE signal has phase and amplitude characteristics substantially similar to an output of the low pass filter 27 resulting from a received BUS PILOT TONE transmitted by the transmitter section 20.

Alternatively, the phase and amplitude conditioner 31 may be adapted to provide a CONDITIONED PILOT TONE signal that (1) has amplitude charateristics substantially similar to an output of the low pass filter 27 resulting from a received BUS PILOT TONE transmitted by the transmitter section 20, and (2) is phase shifted 180 degrees relative to such received BUS PILOT TONE which originated from the transmitter section 20. An addition circuit would then be utilized instead of the subtraction circuit 29.

The output of the subtraction circuit 29 (or addition circuit) is provided to a bandpass filter 33 which removes noise and extraneous signals from such output. When only the transmitter section 20 is transmitting, the output of the bandpass filter 33 would be at most a small signal. A received BUS PILOT TONE signal from another transmitter would appear at the output of the bandpass filter 33. Since the BUS PILOT TONE signal is primarily a single frequency tone, the bandpass filter 33 can have relatively sharp cut-off characteristics to improve the noise immunity of the circuitry that utilizes its output, depending on the filter response time required for proper protocol operation of the terminal. Effectively, the circuitry including the phase and amplitude conditioner 31, the subtraction circuit 29, and the bandpass filter 33 compares the PILOT TONE signal with the received BUS PILOT TONE signal to determine whether or not they agree.

The bandpass filter 33 has its output coupled to the non-inverting input of a voltage comparator 35 and to the inverting input of a voltage comparator 37. The inverting input of the comparator 35 is connected to a positive threshold voltage +V, and the non-inverting input of the comparator 37 is connected to a negative threshold voltage −V. The threshold voltages +V and −V are chosen so that only the presence of a received BUS PILOT TONE signal from another terminal will cause the outputs of the comparators 35 and 37 to be high. Specifically, when the output of the bandpass filter 33 exceeds the +V threshold, the comparator 35 provides a high output. When the output of the bandpass filter 33 goes below the −V threshold, the comparator 37 provides a high output.

The outputs of the comparators 35 and 37 are coupled to a two input OR gate 39 and a three input OR gate 41. The other input to the OR gate 41 is the DATA ENABLE 3 signal provided by the station equipment and shown in FIG. 2. As mentioned previously, the DATA ENABLE 3 signal goes high with the DATA ENABLE 2 signal, but goes low after the DATA ENABLE 2 signal goes low. Specifically, the DATA ENABLE 3 signal is timed to stay high longer than the DATA ENABLE 2 signal to insure detection of any collision at the end of transmission of the transmitter section 20. The DATA ENABLE 3 signal and the output of the OR gate 39 are connected as inputs to an AND gate 43.

The OR gate 41 provides as its output an ACTIVITY signal which indicates whether bus activity is present (high) or not (low). The AND gate 43 provides as its output a COLLISION signal which indicates whether collision has occurred (high). Specificlaly, when either of the comparators 35 and 37 provides a high output, the ACTIVITY signal output of the OR gate 41 goes high and the output of the OR gate 39 also goes high. If one of the comparators 35 and 37 provides a high output and the DATA ENABLE 3 signal is high, then the COLLISION signal from the AND gate 43 is high. The ACTIVITY signal is always high when the DATA ENABLE 3 signal is high since the associated station equipment is causing activity of the data bus 11.

Figure 3:
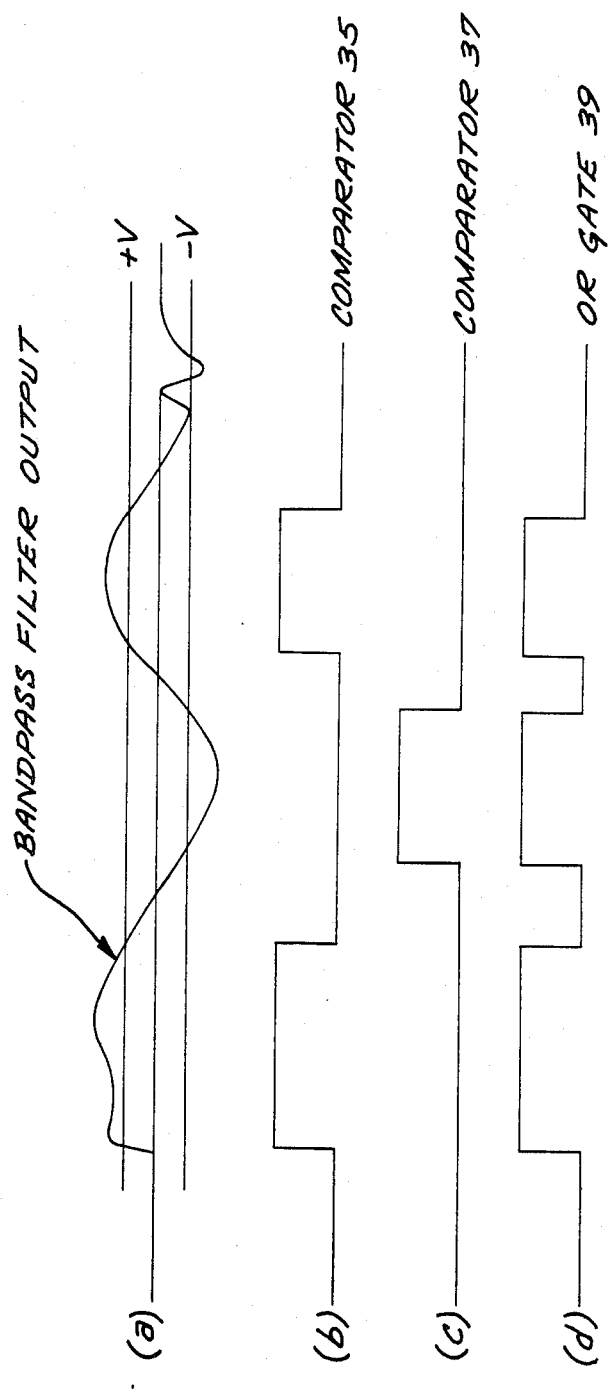
FIG. 3 is a timing diagram of signals utilized in the receiver of the transceiver of FIG. 1.

Referring now to FIG. 3, shown therein are selected signal waveforms of the receiver 30. The waveform (a) shows a typical output of the bandpass filter 33 during the presence on the data bus 11 of a BUS PILOT TONE which was transmitted from another terminal. The waveform (b) illustrates the output of the voltage comparator 35 in response to the bandpass filter output shown in the waveform (a). The waveform (c) illustrates the output of the voltage comparator 37 in response to the bandpass filter output shown in the waveform (a). The waveform (d) illustrates the output of the OR gate 39 in response to the outputs of the voltage comparators 35 and 37.

The waveforms of the ACTIVITY and COLLISION outputs of the OR gate 41 and the AND gate 43 in response to the waveforms (b) through (d) will depend on the state of the DATA ENABLE 3 signal. If the DATA ENABLE 3 signal is high, then the ACTIVITY signal will be continuously high, and the COLLISION signal will follow the waveform (d). If the DATA ENABLE 3 signal is low, the ACTIVITY signal will be the OR'd combination of the waveforms (b) and (c), and would be similar to the waveform (d). With the DATA ENABLE 3 signal low, the COLLISION signal will also be low.

Thus, the occurrence of collision with transmission by the transmitter section 20 is indicated by a sequence of high states of the COLLISION signal at the output of the AND gate 43. Activity on the data bus 11 is indicated by a sequence of high states of the ACTIVITY signal at the output of the OR gate 41 when the transmitter section 20 is not transmitting. When the transmitter section 20 is transmitting, the DATA ENABLE 3 signal is high and, therefore, the ACTIVITY signal is high at least during the time the transmitter section 20 is transmitting which is defined by the DATA ENABLE 2 signal.

The gaps in the ACTIVITY signal as illustrated by the waveform (d) may be appropriately removed by hysteresis or integration techniques to assure a continuous high ACTIVITY signal, should this be necessary for the operation of subsequent logic elements. While the COLLISION signal also has gaps, a collision condition can be declared upon the first positive going edge of the COLLISION signal. A collision recovery protocol would then be implemented. Thus, the gap in the COLLISION signal should have no effect on subsequent logic elements. Of course, if appropriate, the gaps in the COLLISION signal can be removed by hysteresis or integration techniques.

The foregoing transceiver 10 has been described in the context of detecting both collision and activity conditions. However, in the event only collision detection or only activity detection is required, the transceiver 10 can be readily adapted to provide only the required information. For example, for collision detection only, the OR gate 41 may be removed. For activity detection only, the OR gate 39 and the AND gate 43 may be removed.

Figure 4:
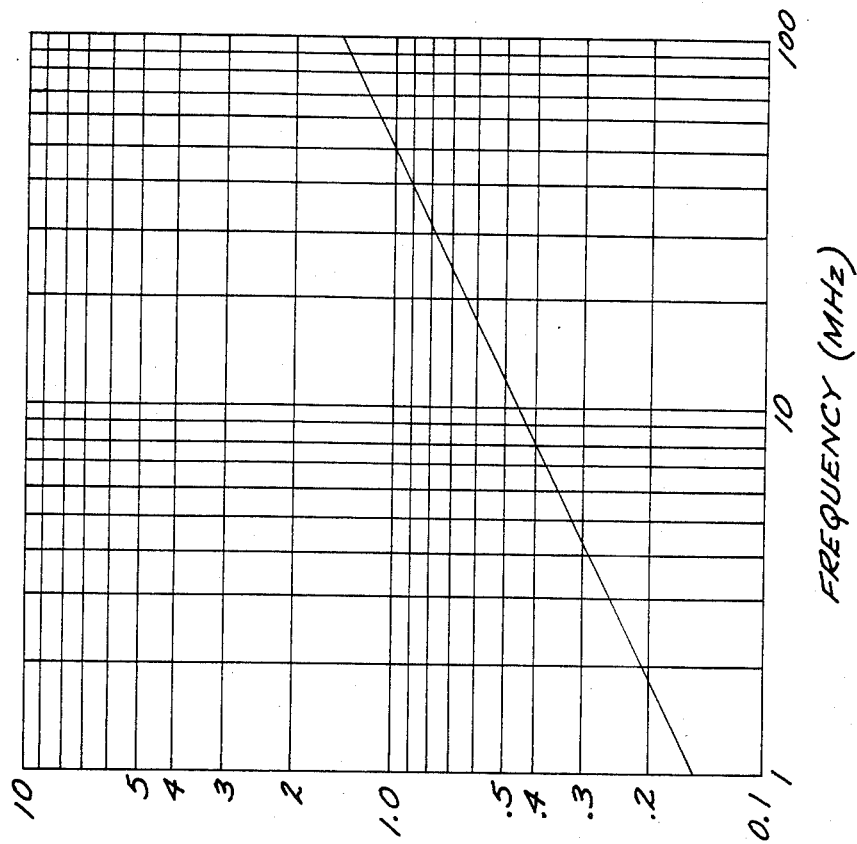
FIG. 4 is a plot of the typical attenuation characteristic of low-loss RG 217 coaxial cable.

The advantages provided by the transceiver of the invention can be further appreciated by reference to the plot of FIG. 4 which shows the attenuation characteristics of RG 217 coaxial cable. At the 1 MHz frequency of the sine wave component of the PILOT TONE signal, the attenuation is less than 0.2 dB per 100 feet. The 100 MHz component of the BUS DATA signal is attenuated by about 1.5 dB per 100 feet. Clearly, the BUS PILOT TONE signal will suffer only small attenuation in comparison to the attenuation of the BUS DATA signal. For example, along 1000 feet of RG 217 cable, a 1 MHz PILOT TONE signal would be attenuated by about 1.5 dB while a DATA OUT signal would be attenuated by about 15 dB.

In addition to the fact that the BUS PILOT TONE is not severly attenutated, the reflections of the BUS PILOT TONE are small. Specifically, since the BUS PILOT TONE signal is relatively lower in frequency than the BUS DATA signal, the capacitive loads on the data bus 11 caused by the terminal couplings do not drastically affect the voltage standing-wave ratio (VSWR) of the BUS PILOT TONE signal. Therefore, when the PILOT TONE signal is turned off, the reflections of the BUS PILOT TONE signal are very small.

Accordingly, with the disclosed system, collision and/or activity is very reliably detected since the dynamic range of a valid BUS PILOT TONE is small and therefore a BUS PILOT TONE signal is always easily detected by a receiver even when its associated transmitter is transmitting. Further, since the BUS PILOT TONE reflections are so small, they are not erroneously detected as indicating activity on the data bus 11.

Although the foregoing has been a description and illustration of specific embodiments of the invention, various modifications and changes thereto can be made by persons skilled in the art without departing from the scope and spirit of the invention as defined by the following claims.

What is claimed is:

1. A transceiver for a local area network system having a communications medium comprising:
   a. transmitter means for providing a communications signal for transmission on the communications medium, said communications signal including a transmit data component and a transmit reference component;
   b. means for receiving signals on the communications medium and for separating a received signal into a received data component and a received reference component; and
   c. comparison and logic means responsive to said transmit reference component and to said received reference component for providing an output indicative of whether a transmission collision has occurred, said comparison and logic means including:
      i. means for comparing said transmit reference component with said received reference component and for providing an output indicative of whether said received reference component is based on said transmit reference component, said comparing means including:
         (a) conditioning means responsive to said transmit reference component for providing a conditioned reference signal adapted to be substantially similar to a received reference component which is based on said transmit reference component, and
         (b) means for subtracting said conditioned reference signal from said received reference component to provide said comparing means output; and
      ii. logic means responsive to the output of said comparing means for providing said output indicative of whether a transmission collision has occurred.

2. A transceiver for a local area network system having a communications medium comprising:
   a. transmitter means for providing a communications signal for transmission on the communications medium, said communications signal including a transmit data component and a transmit reference component;
   b. means for receiving signals on the communications medium and for separating a received signal into a received data component and a received reference component; and c. comparison and logic means responsive to said transmit reference component and to said received reference component for providing an output indicative of whether a transmission collision has occurred, said comparison and logic means including:

i. means for comparing said transmit reference component with said received reference component and for providing an output indicative of whether said received reference component is based on said transmit reference component, said comparing means including:

(a) conditioning means responsive to said transmit reference component for providing a conditioned reference signal adapted to be substantially similar and 180 degrees out of phase relative to a received reference component which is based on said transmit reference component, and (b) means for adding said conditioned reference signal and said received reference component to provide said comparing means output; and ii. logic means responsive to the output of said comparing means for providing said output indicative of whether a transmission collision has occured.

3. In a local area network transceiver having a data transmitter for providing a transmit data signal for transmission on a communications medium and a receiver for receiving signals on the communications medium to provide a received signal, a detection circuit comprising:

a. reference means for selectively providing a transmit reference signal at least during the presence of the transmit data signal;

b. means for combining said transmit reference signal and the transmit data signal to provide a communications signal for transmission on the communications medium;

c. means for filtering a received signal into a received data component and a received reference component; and d. comparison and logic means responsive to said reference means and to said received reference component for providing an output indicative of whether transmission collision has occurred, said comparison and logic means including:

i. means for comparing said transmit reference signal with said received reference component and for providing an output indicative of whether said received reference component is based on said transmit reference signal, said comparing means including:

(a) conditioning means responsive to said transmit reference signal for providing a conditioned reference signal adapted to be substantially similar to a received reference component which is based on said transmit reference signal, and (b) means for subtracting said conditioned reference signal from said received reference component to provide said comparing means output; and ii. logic means responsive to the output of said comparing means for providing said output indicative of whether transmission collision has occurred.

4. In a local area network transceiver having a data transmitter for providing a transmit data signal for transmission on a communications medium and a receiver for receiving signals on the communications medium to provide a received signal, a detection circuit comprising:

a. reference means for selectively providing a transmit reference signal at least during the presence of the transmit data signal;

b. means for combining said transmit reference signal and the transmit data signal to provide a communications signal for transmission on the communications medium;

c. means for filtering a received signal into a received data signal and a received reference component; and d. comparison and logic means responsive to said reference means and to said received reference component for providing an output indicative of whether transmission collision has occurred, said comparison and logic means including:

i. means for comparing said transmit reference signal with said received reference component and for providing an output indicative of whether said received reference component is based on said transmit reference signal, said comparing means including:

(a) conditioning means responsive to said transmit reference signal for providing a conditioned reference signal adapted to be substantially similar and 180 degrees out of phase relative to a received reference signal, and (b) means for adding said conditioned reference signal and said received reference component to provide said comparing means output; and ii. logic means responsive to the output of said comparing means for providing said output indicative of whether transmission collision has occurred.

5. The apparatus of any of claims 1, 2, 3 and 4 characterized further in that said logic means is additionally responsive to a locally generated signal associated with the transmission of said communications signal for providing an output indicative of whether there is locally generated activity on the communications medium.

6. The apparatus of claim 5 characterized further in that said logic means is additionally responsive to said comparing means output for providing an output indicative of whether there is remotely generated activity on the communications medium.

* * * * *